(12) United States Patent
Blakely et al.

(10) Patent No.: US 7,979,794 B2
(45) Date of Patent: *Jul. 12, 2011

(54) METHOD AND SYSTEM FOR DYNAMIC CREATION OF MIXED LANGUAGE HYPERTEXT MARKUP LANGUAGE CONTENT THROUGH MACHINE TRANSLATION

(75) Inventors: Jason Y. Blakely, Apex, NC (US); Dennis D. King, Cary, NC (US); Richard J. Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 475 days.

This patent is subject to a terminal disclaimer.

(21) Appl. No.: 12/212,821

(22) Filed: Sep. 18, 2008

(65) Prior Publication Data

US 2009/0013249 A1 Jan. 8, 2009

Related U.S. Application Data

(62) Division of application No. 09/577,722, filed on May 23, 2000, now Pat. No. 7,437,669.

(51) Int. Cl.
*G06F 17/00* (2006.01)
(52) U.S. Cl. ...................................................... 715/264
(58) Field of Classification Search .................. 715/205, 715/264, 265
See application file for complete search history.

(56) References Cited

U.S. PATENT DOCUMENTS

| 6,370,497 | B1 * | 4/2002 | Knowles ........................... 704/1 |
| 6,438,515 | B1 * | 8/2002 | Crawford et al. ................. 704/5 |
| 6,964,014 | B1 * | 11/2005 | Parish ........................... 715/205 |
| 7,168,040 | B2 * | 1/2007 | Yamamoto et al. ............ 715/234 |
| 2001/0029455 | A1 * | 10/2001 | Chin et al. ..................... 704/277 |
| 2002/0128814 | A1 * | 9/2002 | Brandon et al. ................. 704/1 |
| 2006/0069567 | A1 * | 3/2006 | Tischer et al. ................ 704/260 |
| 2006/0190250 | A1 * | 8/2006 | Saindon et al. ............... 704/235 |

OTHER PUBLICATIONS

Resnik, Evaluating Multilingual Gisting of Web Pages, Google 1997, pp. 129-137.*
Bian et al., Integrating Query Translation and Document Translation in a Cross-Language Information Retrieval System, Google 1998, pp. 250-265.*

* cited by examiner

*Primary Examiner* — Cong-Lac Huynh
(74) *Attorney, Agent, or Firm* — Steven M. Greenberg, Esq.; Carey, Rodriguez, Greenberg & Paul

(57) ABSTRACT

A mixed translation of content is created in one document based on a new use of the lang' attribute on standard HTML tags. The HTML 4.0 specification defines the 'lang' attribute as being used for an element's attribute value and content. Browsers use this information to assist in proper rendering of content associated with treatment of ligatures, hyphenations and quotations. Search engines and other applications may use this field for spell checking or creating indices. The implication of this common usage is that the content is in the language indicated by the 'lang' attribute and language specific rules for its rendering apply.

9 Claims, 2 Drawing Sheets

METHOD AND SYSTEM FOR DYNAMIC CREATION OF MIXED LANGUAGE HYPERTEXT MARKUP LANGUAGE CONTENT THROUGH MACHINE TRANSLATION

CROSS-REFERENCE TO RELATED APPLICATIONS

This application is a Divisional of U.S. application Ser. No. 09/577,722 filed on May 23, 2000, U.S. Pat. No. 7,437,669 which is incorporated herein by reference in its entirety.

FIELD OF THE INVENTION

This invention relates in general to computer software, and in particular to a method and system for dynamic creation of fixed language HTML content through Machine Translation.

BACKGROUND OF THE INVENTION

Machine Translation (MT) is an emerging technology for the translation of text from one language to another. A number of vendors such as Systran, L&H, Transparent Languages, etc. provide Machine Translation software. On-The-Fly (OTF) MT is a unique approach to MT. OTF MT has been introduced in WebSphere Application Server (WAS) 3.0 (trademark of IBM Corp.) via the IBM HTTP Server (IHS) for static HTML and CGIs and for dynamic servlet content via the application server. OTF MT allows for automatic MT initiated by configuration, user preference, control data or other reasons none of which require direct human intervention once configured. The mechanism for OTF MT in WAS 3.0 is based on configuration settings to indicate that MT is allowed and by a value in an Accept-Language field of the request-header for an HTTP request. This is a unique approach to OTF MT. The Accept-Language field is set by the browser based on user preferences. This approach provides a user preferred yet administrator authorized solution and is very valuable. These OTF MT techniques are associated with an entire HTML page or file of content. All of the textual language in the page is the target of translation. As content creators and host systems become more global in nature, a need is rapidly emerging whereby it is required that language content within the same page be mixed. No known solutions currently provide the ability to dynamically (OTF) translate different parts of an HTML page from any language into any other.

SUMMARY OF THE INVENTION

The present invention describes a new technique using standard HTML tags and attribute declarations to specify the need for mixed language content for translation as well as the language to translate it to. Thus mixed language is possible within the same page of content. Once specified, the actual MT can be dynamically initiated.

In one aspect of the invention, a method and system is provided for determining a target language for automatic programmatic translation of text in a first language. An author first creates text in the first language (most likely his native language). An HTML 'lang' attribute is used to determine at least one target language that is different from the first language. The first language is then automatic programmatically translated into at least one target language using the 'lang' attribute as a key for machine translation. In addition, any appropriate method such as Language Guessing may be used to determine the first language. A mixed language content can be created by using a plurality of target languages for translation into from the first language.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
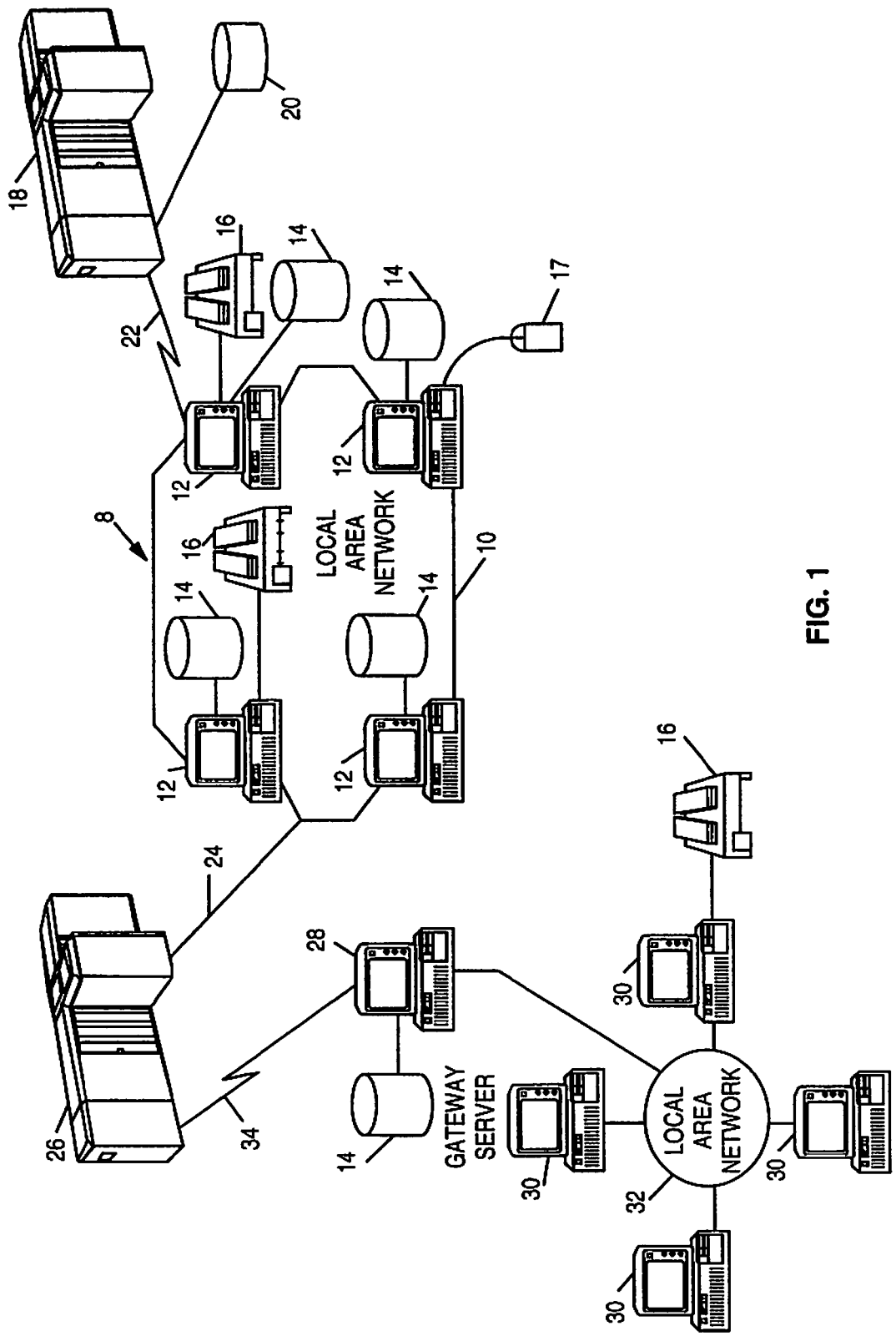
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

A solution to the problem of how to create mixed translation of content within one document is based on a new use of the 'lang' attribute on standard HTML tags. The HTML 4.0 specification defines the 'lang' attribute as being used for an element's attribute value and content. Browsers use this information to assist in proper rendering of content associated with treatment of ligatures, hyphenations and quotations. Search engines and other applications may use this field for spell checking or creating indices. The implication of this common usage is that the content is in the language indicated by the 'lang' attribute and language specific rules for its rendering apply.

The present invention uses the 'lang' attribute value as a determining factor in the MT decision and allows multiple MT decisions within a page, thus enabling the creation of mixed language content documents. Prior to the content in a response being served, appropriate MT would be initiated based on this value. In addition to its current use, a new use of this attribute would be defined as the target language of MT. Now an HTML author or a program that dynamically creates content can do so in their language of choice yet the 'lang' attribute for an element would define the languages the various pieces of content should be translated to. Known techniques, such as, for example, Language Guessing could be used to determine the source language. Normal use of the same exact 'lang' attribute would still be applicable in terms of its use to make target rendering decisions since the MT of the content would occur prior to the use of the 'lang' attribute in rendering decisions. This solution could be implemented in, for example, the IBM HTTP Server and/or the IBM WebSphere Application Server (trademarks of IBM Corp.) or any other system that supports or processes HTML.

As an example, consider a kiosk set up in a public location such as an airport. The kiosk is intended for people at the airport to get information about the location of various services available inside the airport terminal, such as, where a first aid station is located. Since an airport is likely to have travelers that speak many languages, the kiosk application must present directions in these many languages at the same time to be useful. The present invention could be applied to the system to present a screen that contains mixed language content in one screen, thus allowing one screen to contain directions for the same location in many languages at the same time. As a result of the present invention, the creator of the kiosk system can develop the screen in one language only and have it programmically rendered in any number of mixed content views thus saving time, money, disk storage space, etc. As defined herein programmatic means actions that are initiated by a computer program. There is no requirement for the user to set any preference or take any action. For the present invention the user is not involved in the MT decision.

Figure 2:
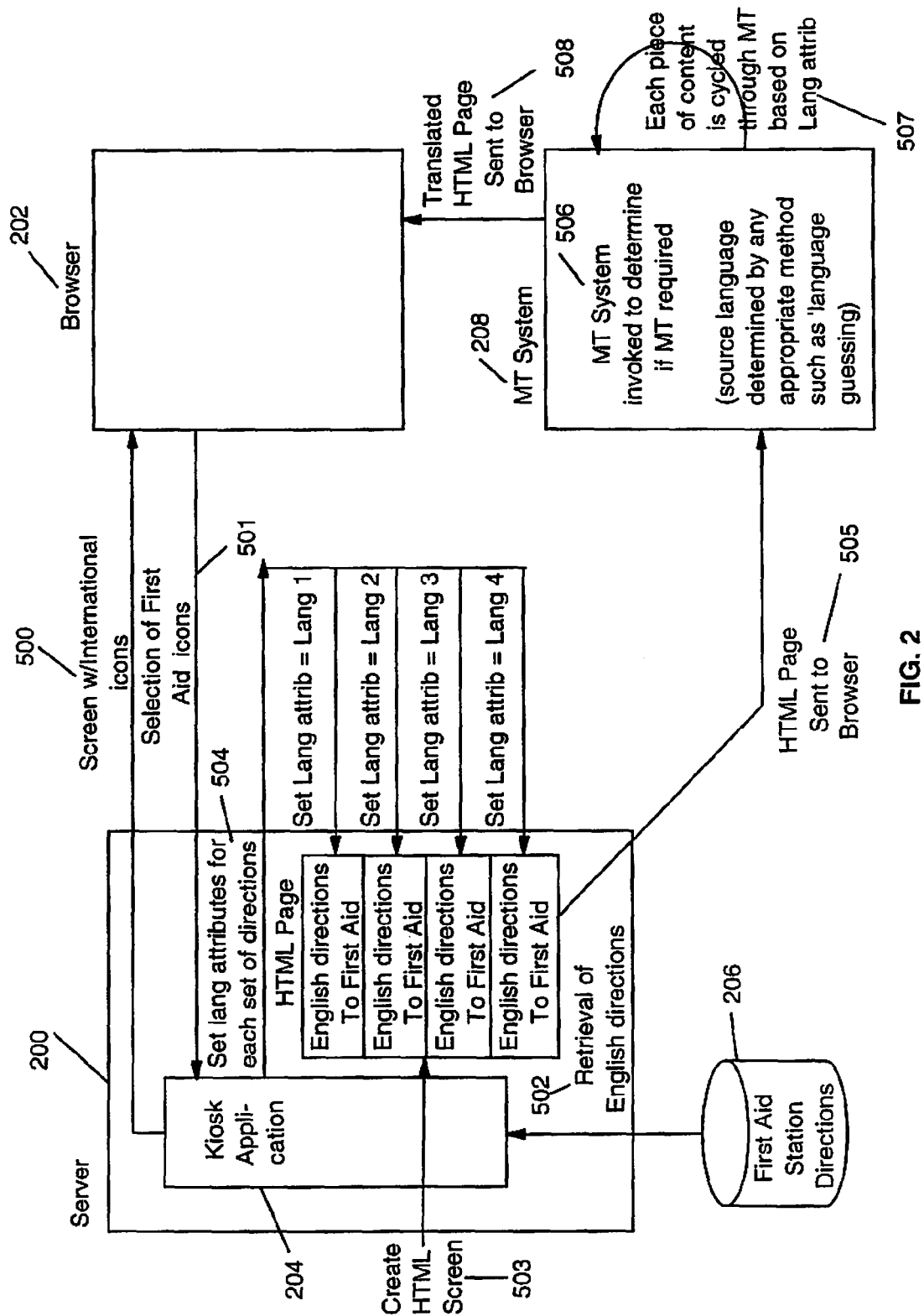
FIG. 2 is a schematic flow diagram of the present invention.

Referring to FIG. 2, a scenario for use of the present invention would be: The initial screen for this kiosk would contain international icons (i.e. pictures) indicating the various items it is capable of providing directions for. For this example, there are icons for restrooms, first aid, telephones, and police. These icons by definition are language neutral and understood by speakers of a number of native languages. The user would select the icon for which directions are desired (for example, first aid). The application was developed to display directions in four languages (i.e. French, Spanish, German and Italian). The user would be presented with an interface that contains four sets of directions equally spaced on the screen. Each set of directions would be in a different language but identifying the same location. As a result of the present invention, the author of the directions would only have to create the directions in one language. If the author speaks English, the directions could be created in English only, even though English is not one of the languages presented by the kiosk.

An application flow to implement the above scenario could be as follows: A kiosk could be comprised of a Server 200 and a Browser 202 (the Server 200 and Browser 202 could be located on the same machine or on separate interconnected machines. The server could include a Kiosk Application 204 and a storage device 206. An MT System 208 could be co-located with the Server 200 or with a separate interconnected machine.

Through conventional means, the Kiosk Application 204 creates a screen that contains international icons (i.e. pictures), and presents it to the user on Browser 202, as indicated by reference numeral 500. Based on which icon (i.e., per this example, first aid) is selected by the user, through any appropriate conventional means such as a touch screen as indicated by reference numeral 501, the Kiosk Application 204 retrieves from storage device 206 (or creates) directions in one particular language (the one language the directions were created in, in this case English), as indicated by reference numeral 502.

Through conventional means, the Kiosk Application 204 creates an HTML screen at 503 with the previously retrieved or created directions repeatedly included a number of times equal to that of the number of languages supported by this application (in this example, four). Since the directions were created in English, all four sets of directions will be in English at this point. The Kiosk Application 204 would set at 504 the 'lang' attribute of each set of directions to the desired language (i.e., to French, Spanish, German or Italian).

The Kiosk Application 204 would then send the HTML page at 505 to the browser. However, just prior to the HTML being sent to the browser, the MT system 208 would be invoked to determine if MT is required based on the contents of the 'lang' attribute in each piece of content in the HTML page.

MT would be invoked for each piece of content that has a 'lang' attribute different than that of the associated piece of content. Each set of content would be translated based on its unique language requirement, as identified in its associated 'lang' attribute. In this example, the four sets of English will be translated at 507, sequentially, into the four other languages needed for display at the Browser 202. The newly translated content is then sent at 508 to the Browser 202 for display to the user in French, Spanish, German and Italian.

Thus, the present invention provides the benefits of being able to author text in only one language. The text can be translated on-the-fly into any other languages and can then be displayed in any desired mix of languages on a single page.

Although the present invention has been described with respect to a specific preferred embodiment thereof, various changes and modifications may be suggested to one skilled in the art and it is intended that the present invention encompass such changes and modifications as fall within the scope of the appended claims.

What is claimed:

1. A computer system comprising a plurality of networks each includes a plurality of computers for performing a method for determining a target language for automatic programmatic translation of text in a first language, comprising:

creating text in the first language, the text being in a single discrete document;

using an HTML 'lang' attribute to set at least one target language for a portion of the text which is different from the first language; and, automatically programmatically translating the portion having the first language into said at least one target language with said 'lang' attribute as a key for machine translation in order to produce a mixed translation of the text.

2. The system of claim 1, further comprising:

means for using Language Guessing to determine the first language.

3. The system of claim 1, wherein said at least one target language comprises a plurality of languages resulting in translation into a mixed language content.

4. The system of claim 1, further comprising:

using a second 'lang' attribute to set an additional target language for another portion of the text which is different from the first language and the language specified by said HTML 'lang' attribute; and, automatically programmatically translating the another portion having the first language into said additional target language with said second 'lang' attribute as a key for machine translation.

5. A computer program product recorded on computer readable medium for determining a target language for automatic programmatic translation of text in a first language, comprising:

creating text in the first language, the text being in a single discrete document;

using an HTML 'lang' attribute to set at least one target language for a portion of the text which is different from the first language; and automatically programmatically translating the portion having the first language into said at least one target language with said 'lang' attribute as a key for machine translation in order to produce a mixed translation of the text.

6. The program product of claim 5, further comprising:

computer readable means for using Language Guessing to determine the first language.

7. The program product of claim 5, wherein said at least one target language comprises a plurality of languages resulting in translation into a mixed language content.

8. The program product of claim 5, further comprising:

using a second 'lang' attribute to set an additional target language for another portion of the text which is different from the first language and the language specified by said HTML 'lang' attribute; and, automatically programmatically translating the another portion having the first language into said additional target language with said second 'lang' attribute as a key for machine translation.

9. A method of determining a target language for automatic programmatic translation of text in a first language, comprising the steps of:

creating text in the first language;

using an HTML 'lang' attribute to set at least one target language for a portion of the text which is different from the first language;

automatically programmatically translating the portion having the first language into said at least one target language with said 'lang' attribute as a key for machine translation;

using a second 'lang' attribute to set an additional target language for another portion of the text which is different from the first language and the language specified by said HTML 'lang' attribute; and, automatically programmatically translating the another portion having the first language into said additional target language with said second 'lang' attribute as a key for machine translation.

\* \* \* \* \*